(12) United States Patent
Cheng

(10) Patent No.: US 7,804,339 B2
(45) Date of Patent: Sep. 28, 2010

(54) SERIAL BUS INTERFACE CIRCUIT

(75) Inventor: Tung-Shuan Cheng, Tainan County (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 0 days.

(21) Appl. No.: 12/233,617

(22) Filed: Sep. 19, 2008

(65) Prior Publication Data
US 2010/0013522 A1  Jan. 21, 2010

(30) Foreign Application Priority Data
Jul. 18, 2008  (TW) .............................. 97127322 A

(51) Int. Cl.
*H03B 1/00* (2006.01)
(52) U.S. Cl. ........................................ 327/108; 326/86
(58) Field of Classification Search ............... 326/82, 326/83, 86; 327/108–112
See application file for complete search history.

(56) References Cited
U.S. PATENT DOCUMENTS

| | | | | |
|---|---|---|---|---|
| 3,760,380 A * | 9/1973 | Hoffman et al. | ........ | 365/189.05 |
| 5,256,914 A * | 10/1993 | Boomer | ....................... | 326/29 |
| 5,386,153 A * | 1/1995 | Voss et al. | ..................... | 326/34 |
| 5,654,645 A * | 8/1997 | Lotfi | ........................... | 326/24 |
| 5,889,416 A * | 3/1999 | Lovett | ........................ | 326/121 |
| 6,091,264 A * | 7/2000 | Kirsch et al. | ................... | 326/70 |
| 6,970,015 B1* | 11/2005 | Chan et al. | ..................... | 326/82 |
| 2004/0032287 A1* | 2/2004 | Pihlstrom | ................... | 327/108 |
| 2008/0054943 A1* | 3/2008 | Ramaraju et al. | ............. | 326/83 |

* cited by examiner

*Primary Examiner*—Lincoln Donovan
*Assistant Examiner*—William Hernandez
(74) *Attorney, Agent, or Firm*—Winston Hsu; Scott Margo; Min-Lee Teng

(57) ABSTRACT

An interface circuit for a serial bus is disclosed and includes a receiving terminal, an output terminal, a first switching circuit, a voltage source, and a second switching circuit. The receiving and output terminals are used for receiving an input signal and outputting a first voltage signal respectively. The first switching circuit is used for determining a coupling relationship between the output terminal and the grounded terminal according to difference between the input signal and a grounding voltage provided by the grounded terminal. The voltage source is used for producing a voltage drop based on a driving voltage driving the serial bus interface circuit to provide a first voltage. The second switching circuit is used for determining a coupling relationship between the first switching circuit and the voltage source according to difference between the input signal and the first voltage.

8 Claims, 9 Drawing Sheets

SERIAL BUS INTERFACE CIRCUIT

BACKGROUND OF THE INVENTION

1. Field of the Invention

The present invention relates to an interface circuit for a serial bus, and more particularly, to an interface circuit for a serial bus for reducing leakage current.

2. Description of the Prior Art

A bus is used for transmitting data, information, addresses, or a clock between a master device and a slave device. There are two types of bus—serial and parallel. A serial bus can transmit a plurality of data simultaneously, and thus save more pins compared to the parallel bus. In the serial bus system, the master device (slave device) utilizes the interface circuit to output a single end logic signal, and the slave device (master device) determines a bit state of a received signal according to a logic level of the received signal.

Please refer to FIG. 1, which is a schematic diagram of an interface circuit 10 for an Inter-Integrated Circuit (I2C) bus. The interface circuit 10 driven by a voltage V2 includes a current source 100, an N type metal oxide semiconductor (NMOS) N1 with a threshold voltage $V_{tn}$ and a Schmitt trigger 120. A master device 12 driven by a voltage V1 is used for transmitting a data signal SDA (or a clock signal) to the interface circuit 10, where the data signal SDA has a maximum voltage level of V1. The NMOS N1, as a switching circuit, receives the data signal SDA from the gate electrode and outputs a voltage signal Vx from the drain electrode. As the NMOS N1 conducts, the current source 100 provides a current IV2 with intensity of I. The Schmitt trigger 120, driven by the voltage V2 as well, is used to converting the voltage signal Vx into the data signal SDA_IN, which is a square wave signal having the maximum voltage level of V2.

Please refer to FIG. 2, which is a schematic diagram of signal timing of the interface circuit 10 shown in FIG. 1. The related signals from top to bottom are illustrated as follows: data signal SDA, voltage signal Vx, data output signal SDA_IN and current IV2. As shown in FIG. 2, the current IV2 passes through the NMOS N1 to the grounded terminal when the data signal SDA conducts the NMOS N1. At this moment, the voltage signal Vx is equal to a grounding voltage across the grounded terminal, and the current IV2 is equal to I. When the data signal SDA has the NMOS N1 shut, the current IV2 is equal to 0, and the voltage signal Vx is equal to V2.

Thus, when the data signal SDA operates at the maximum voltage level V1, the current IV2 operates at the maximum current level of I as well. This causes power consumption in the interface circuit 10. Furthermore, the master device 12 holds the data signal SDA at voltage level V1 during standby. In this situation, the current IV2 acts as a leakage current. Also, the Schmitt trigger 120 encounters the same leakage current situation.

SUMMARY OF THE INVENTION

It is therefore an objective of the present invention to provide an interface circuit for a serial bus for reducing leakage current.

The present invention discloses an interface circuit for a serial bus. The interface circuit includes a receiving terminal, an output terminal, a first switching circuit, a voltage source and a second switching circuit. The receiving terminal is used to receive an input signal. The output terminal is used for outputting a first voltage signal. The first switching circuit is coupled to the receiving terminal, the output terminal and a grounded terminal, and is used for determining a coupling relationship between the output terminal and the grounded terminal according to difference between the input signal and a grounding voltage provided by the grounded terminal. The voltage source is used for generating a voltage drop based on a driving voltage to provide a first voltage. The second switching circuit is coupled to the receiving terminal, the first switching circuit, the output terminal and the voltage source, and used for determining a coupling relationship between the first switching circuit and the voltage source according to difference between the input signal and the first voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
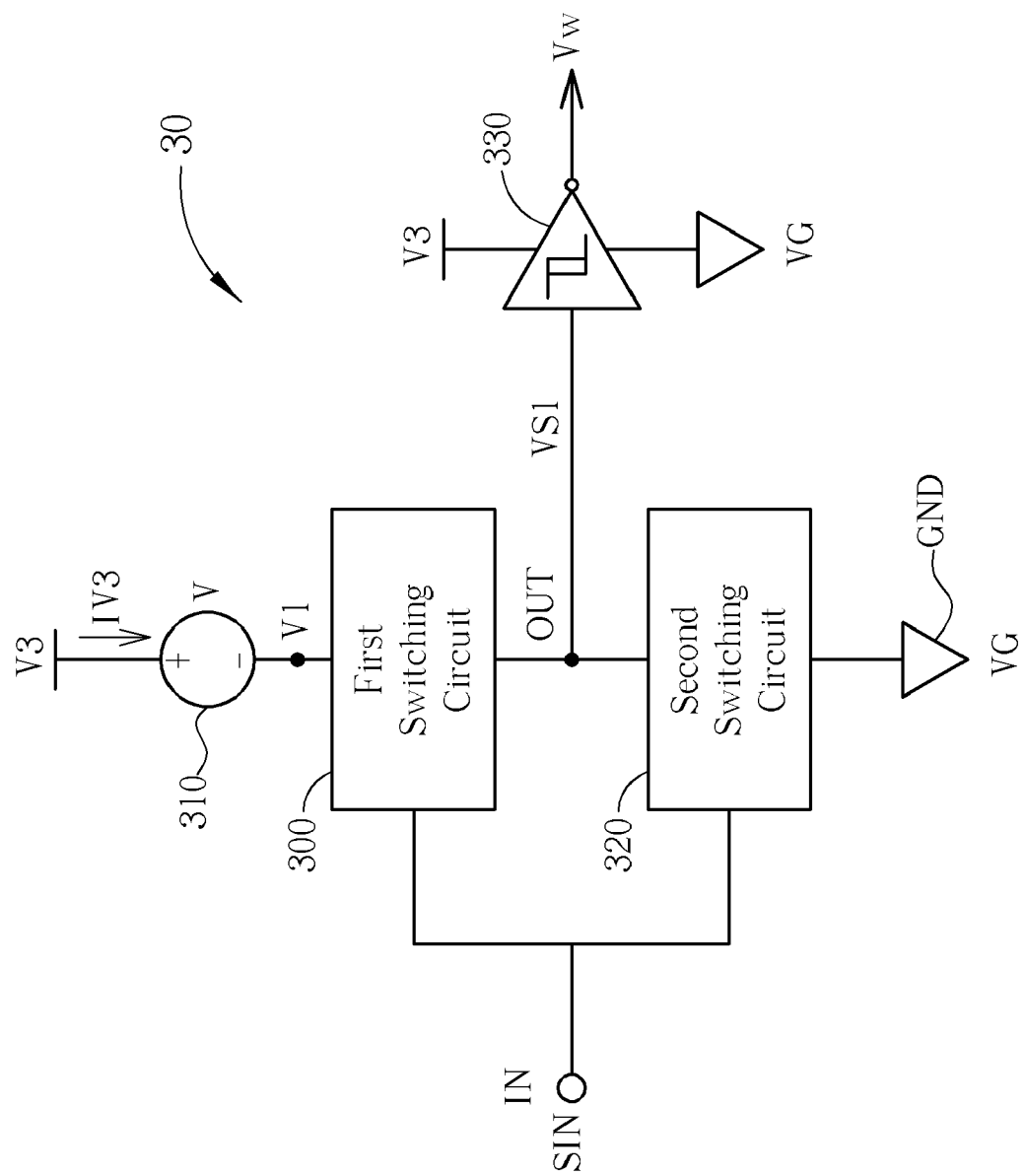
FIG. 3 is a schematic diagram of an interface circuit for a serial bus according to an embodiment of the present invention.

Please refer to FIG. 3, which is a schematic diagram of an interface circuit 30 for a serial bus according to an embodiment of the present invention. The interface circuit 30 is coupled to a driving voltage V3 and a grounded terminal GND which offers a grounding voltage VG. The interface circuit 30 includes a receiving terminal IN, an output terminal OUT, a first switching circuit 300, a voltage source 310, a second switching circuit 320 and a Schmitt trigger 330. The receiving terminal IN is used for receiving an input signal SIN. The output terminal OUT is used for outputting a first voltage signal VS1. The first switching circuit 300 is used for determining a coupling relationship between the output terminal OUT and the grounded terminal GND according to difference between the input signal SIN and the grounding voltage VG. The voltage source 310 used for generating a voltage drop V based on the driving voltage V3 to provide a first voltage V1 (V1=V3−V). In addition to generation of the voltage drop V, the voltage source V3 also provides a current IV3 according to the driving voltage V3. The first switching circuit 300 is used for determining a coupling relationship between the output terminal OUT and the voltage source 310 according to difference between the input signal SIN and the first voltage V1. The Schmitt trigger 330 is used for converting the first voltage signal VS1 into a square wave Vw for control over a slave device. With the corresponding coupling relationship control of the first switching circuit 300 and the second switching circuit 320, the interface circuit 30 allows the current IV3 flowing through the voltage source 310 to the grounded terminal GND only during transitions of the input signal SIN and does not affect the logic levels of the first voltage signal VS1 and input signal SIN.

For example, when the difference between the input signal SIN and the grounding voltage VG is greater than a first predetermined value, the second switching circuit 320 conducts the connection between the output terminal OUT and the grounded terminal GND, otherwise cuts off the connection between the output terminal OUT and the grounded terminal GND. Similarly, when the difference between the input signal SIN and the first voltage V1 is less than a second predetermined value, the first switching circuit conducts the connection between the output terminal OUT and the voltage source 310, otherwise cuts off the connection between the output terminal OUT and the voltage source 310. The first predetermined value is not limited to be equal to the second predetermined value or not.

Figure 1:
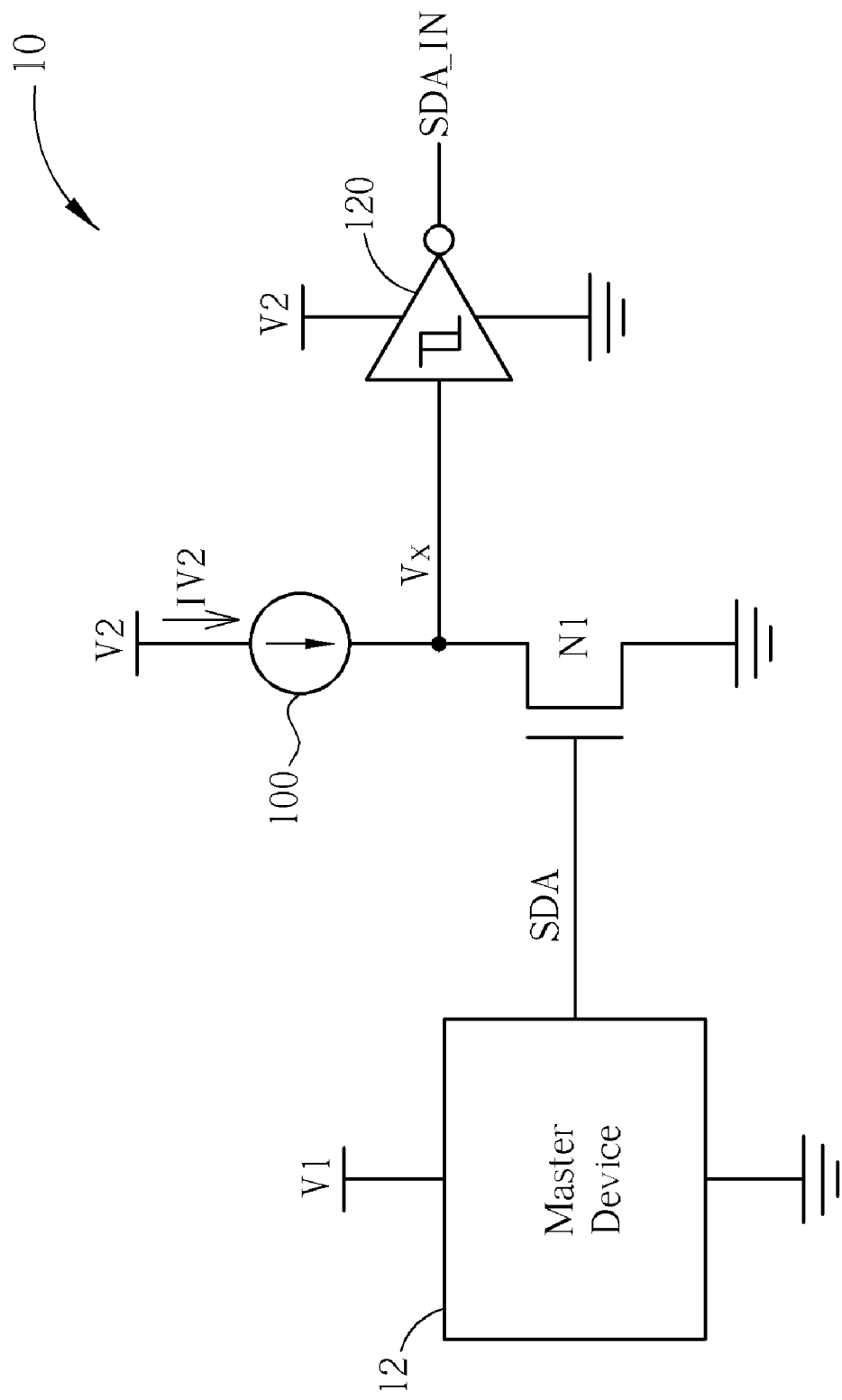
FIG. 1 is a schematic diagram of an interface circuit according the prior art.
Figure 2:
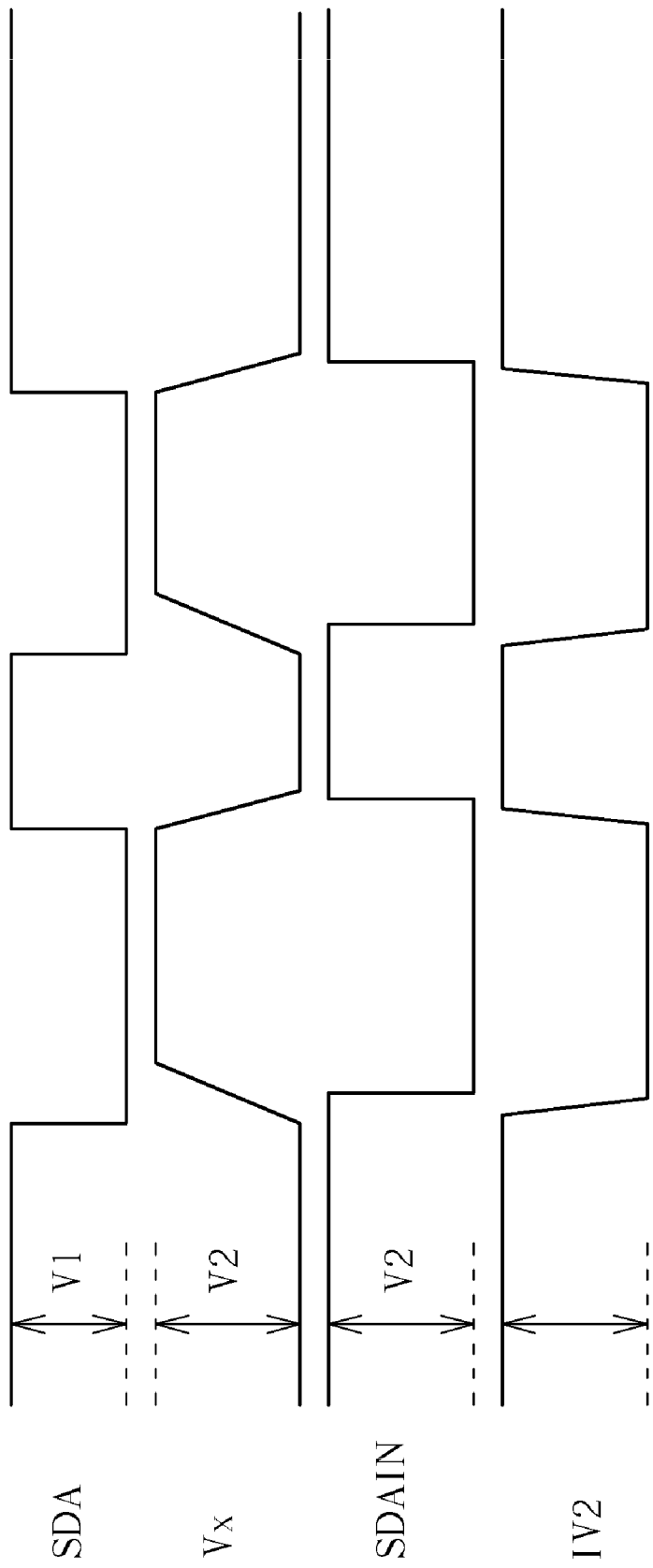
FIG. 2 is a schematic diagram of signal timing of the interface circuit according to FIG. 1.
Figure 4:
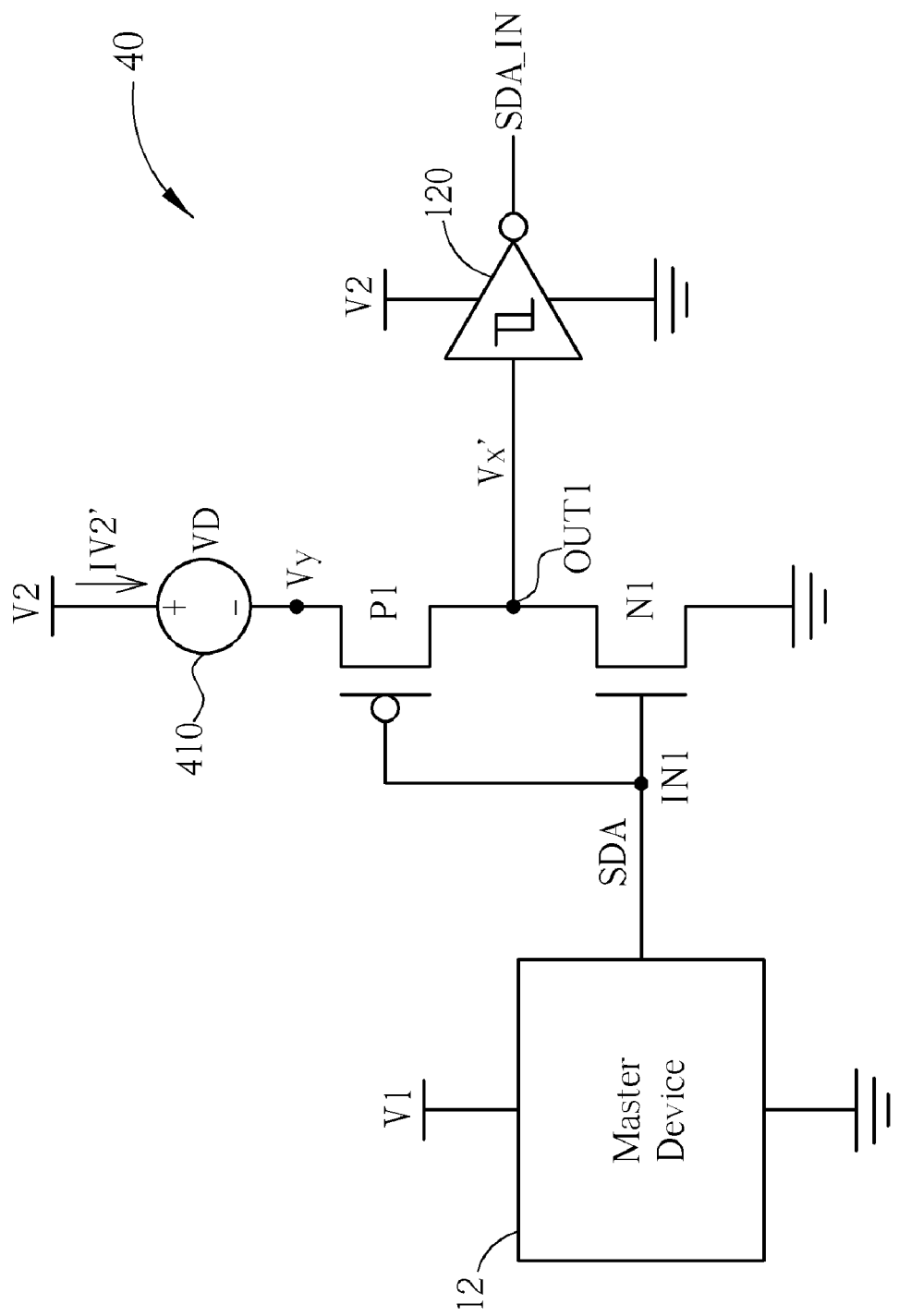
FIG. 4 is a schematic diagram of an interface circuit for an Inter-Integrated Circuit bus according to an embodiment of the present invention.

Please refer to FIG. 4, which is a schematic diagram of an interface circuit 40 for an Inter-Integrated Circuit (I2C) bus according to an embodiment of the present invention. The interface circuit 40 is used for improving the leakage current problem of the interface circuit 10 in FIG. 1. Thus, the same components shown in FIG. 1 and FIG. 4 use the same names and symbols. The interface circuit 40 includes a receiving terminal IN1, an output terminal OUT, an NMOS N1, a voltage source 410, a P type metal oxide semiconductor (PMOS) P1 with a threshold voltage $V_{tp}$ and a Schmitt trigger 120. The receiving terminal IN1 receives the signal data SDA from the master device 12. The output terminal OUT outputs a voltage signal Vx'. The voltage source 410 provides a current IV2' and generates a voltage drop VD against the driving voltage V2 in order to provide a first voltage Vy (Vy=V2−VD). For simplicity, the PMOS P1 and the NMOS N1 form an inverter driven by the first voltage Vy.

When the driving voltage V2 is greater than V1, those skilled in the art should adjust the voltage source 410 letting (V2−VD)<(V1+$V_{tp}$). When the driving voltage V2 is less than V1, the voltage drop VD is preferably as small as possible. Please refer to FIG. 5, which is a schematic diagram of signal timing of the interface circuit 40. The related signals from top to bottom are illustrated as follows: data signal SDA, voltage signal Vx', data output signal SDA_IN and current IV2'.

Figure 5:
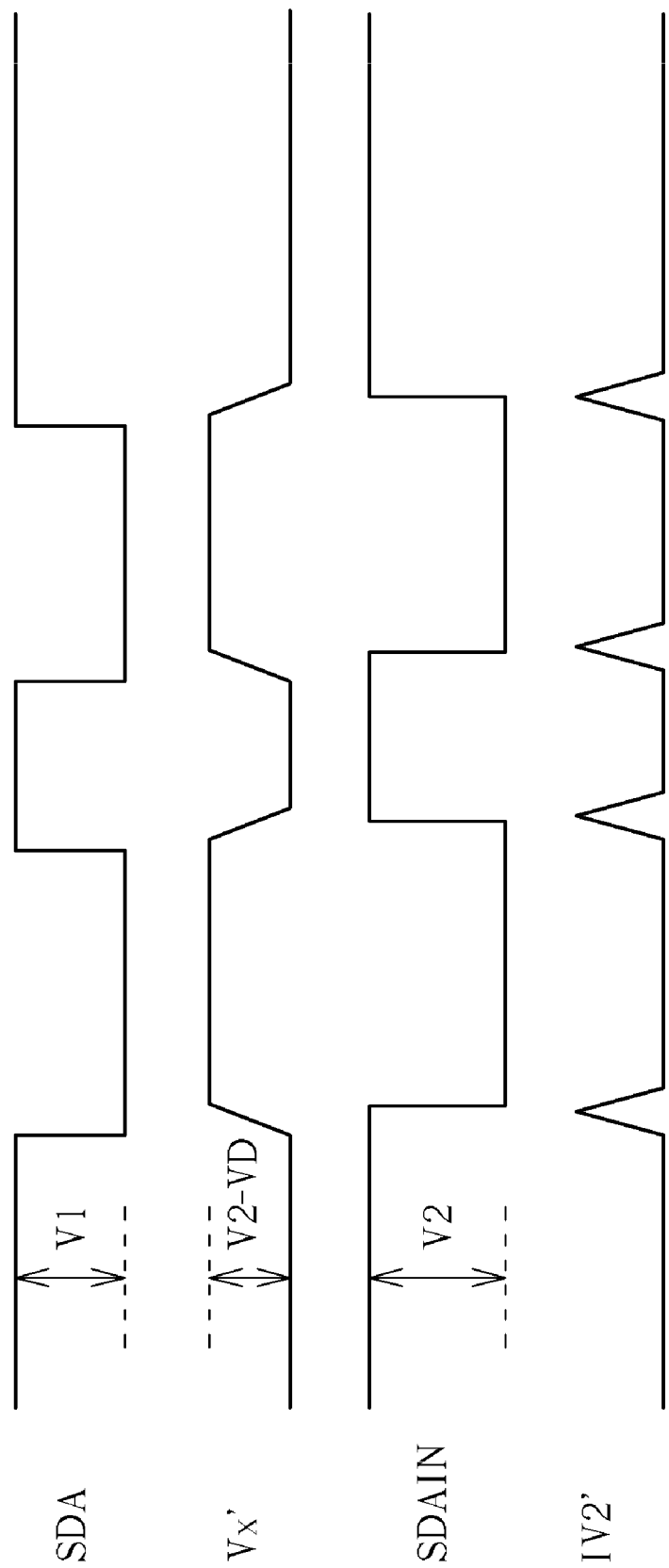
FIG. 5 is a schematic diagram of signal timing of the interface circuit according to FIG. 4.

As shown in FIG. 4 and FIG. 5, when the signal data SDA operates at the high voltage level V1, the difference between the grounding voltage GND and the signal data SDA is higher than the threshold voltage $V_{tn}$. This conducts the NMOS N1 and shuts the PMOS P1. At that time, the voltage signal Vx' is equal to 0. When the signal data SDA operates at a low voltage level, the difference between the first voltage Vy and the signal data SDA is higher than the threshold voltage $V_{tp}$. This conducts the PMOS P1 and shuts the NMOS N1. At that time, the voltage signal Vx' is equal to (V2−VD). In both of the abovementioned situations, no current IV2' is generated in the interface circuit 40. When the data signal SDA undergoes signal transitions, the voltage signal Vx' needs time to transit. During the transition of the voltage signal Vx', the NMOS N1 and PMOS P1 are both conducted simultaneously for a small interval. The corresponding waveform of the current IV2' is shown in FIG. 5. Obviously, the interface circuit 40 dramatically reduces conduct time of the current IV2' compared with the current IV2 of FIG. 1. As a result, the leakage current problem can be improved.

To further reduce the leakage current, an accelerating circuit is installed between the Schmitt trigger 120 and the output terminal OUT for adjusting and boosting the maximum signal level of the voltage signal Vx' to the driving voltage V2. Please refer to FIG. 6, which is a schematic diagram of an interface circuit 60 for an I2C bus according to an embodiment of the present invention. Structure of the interface circuit 60 is similar to that of the interface circuit 40. The only difference is that an accelerating circuit 600 is installed between the Schmitt trigger 120 and the output terminal OUT and includes a PMOS P2 and an inverter 602. When the data signal SDA is at the low level, the voltage signal Vx' turns to exceed a threshold voltage of the inverter 602 during an interval that the voltage signal Vx' rises up to (V2−VD). In this situation, the PMOS P2 is conducted and thereby boosts the voltage signal Vx' to the driving voltage V2.

Figure 6:
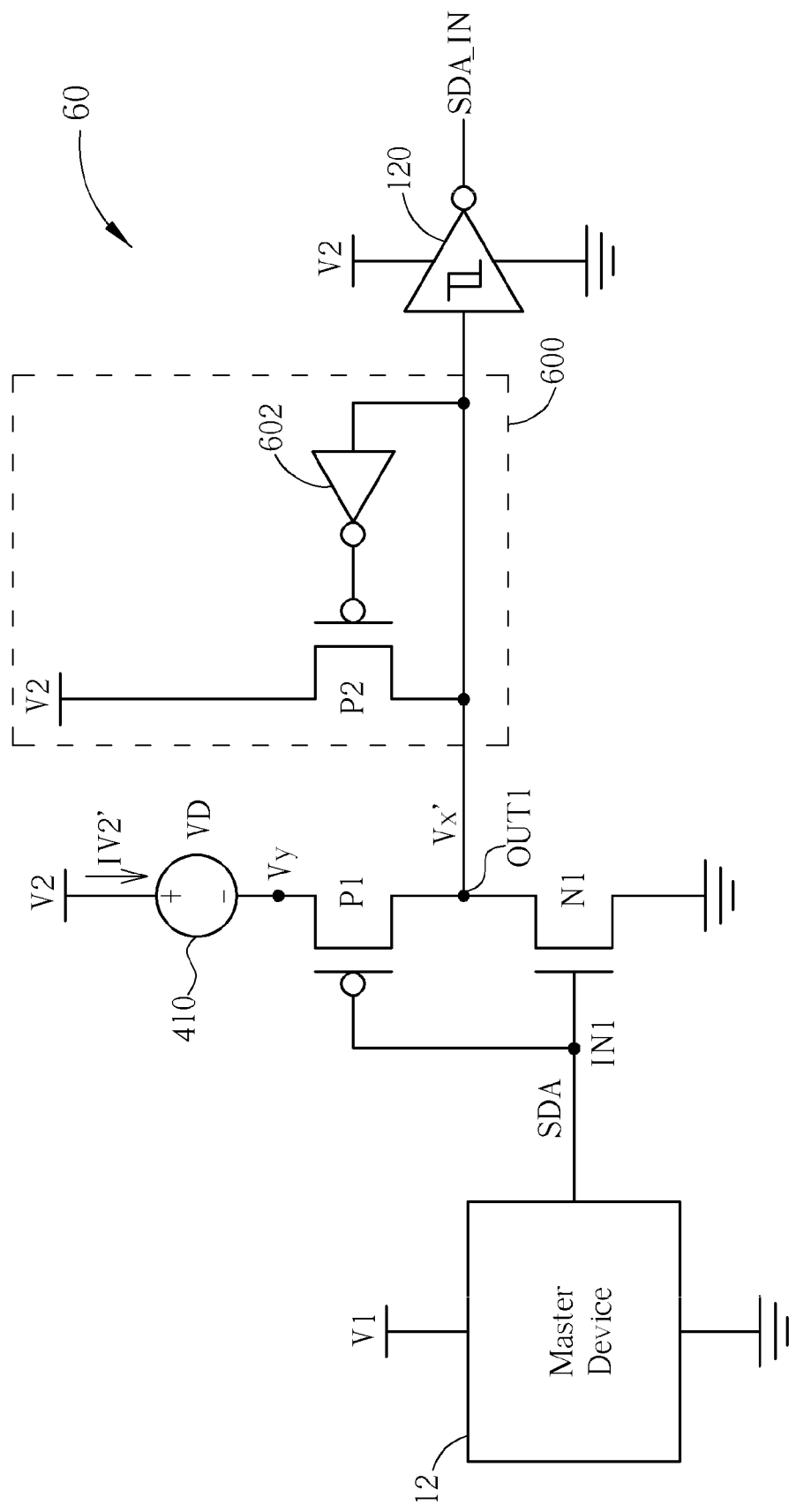
FIG. 6 is a schematic diagram of an interface circuit for an Inter-Integrated Circuit bus according to an embodiment of the present invention
Figure 7:
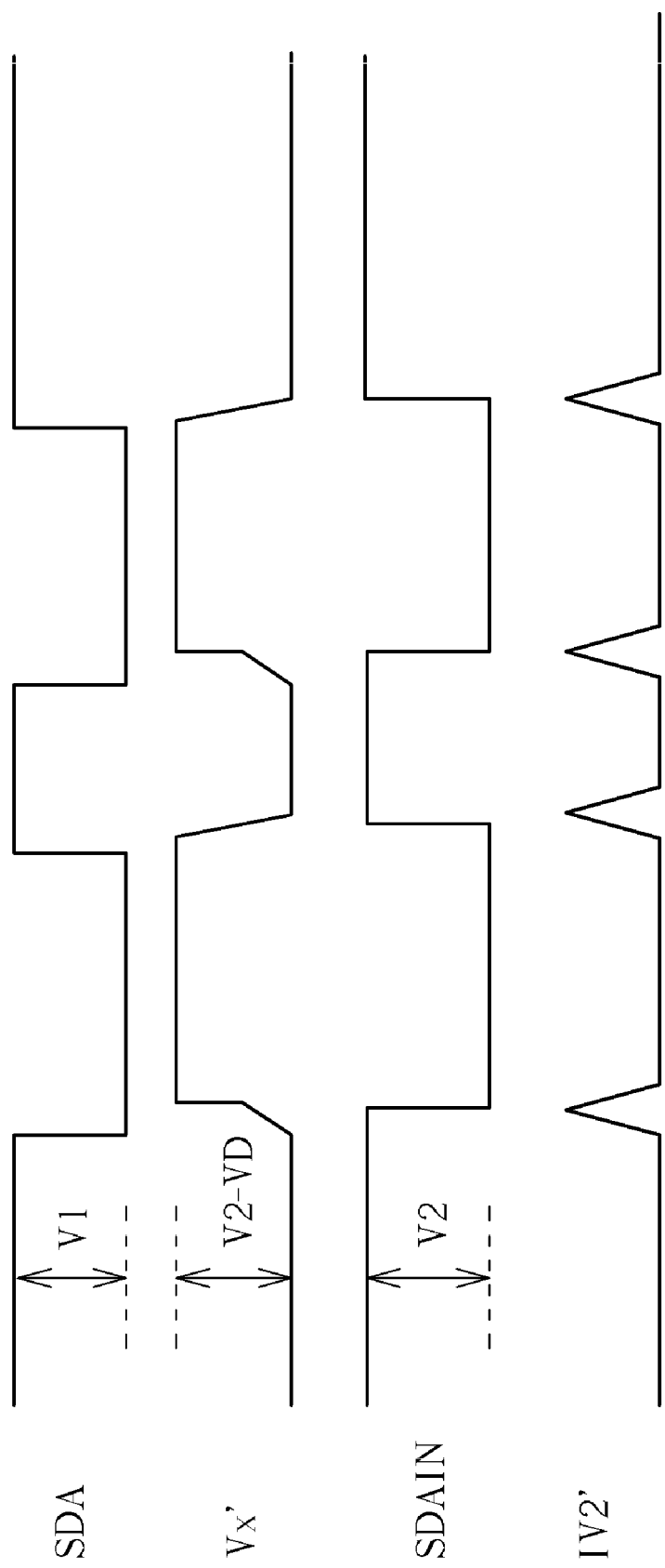
FIG. 7 is a schematic diagram of signal timing of the interface circuit according to FIG. 6.

Please refer to FIG. 7, which is schematic diagram of a signal timing of the interface circuit 60 shown in FIG. 6. As shown in FIG. 7, the voltage signal Vx' in FIG. 7 has a shorter transition time than the voltage signal Vx in FIG. 5 and thereby further reduces the conduct time of the current IV2'. Thus, the interface circuit 60 not only enhances a switching speed of the Schmitt trigger 120, but also reduces the leakage current of the Schmitt trigger 120 caused by the middle voltage level of the voltage signal Vx'.

Figure 8:
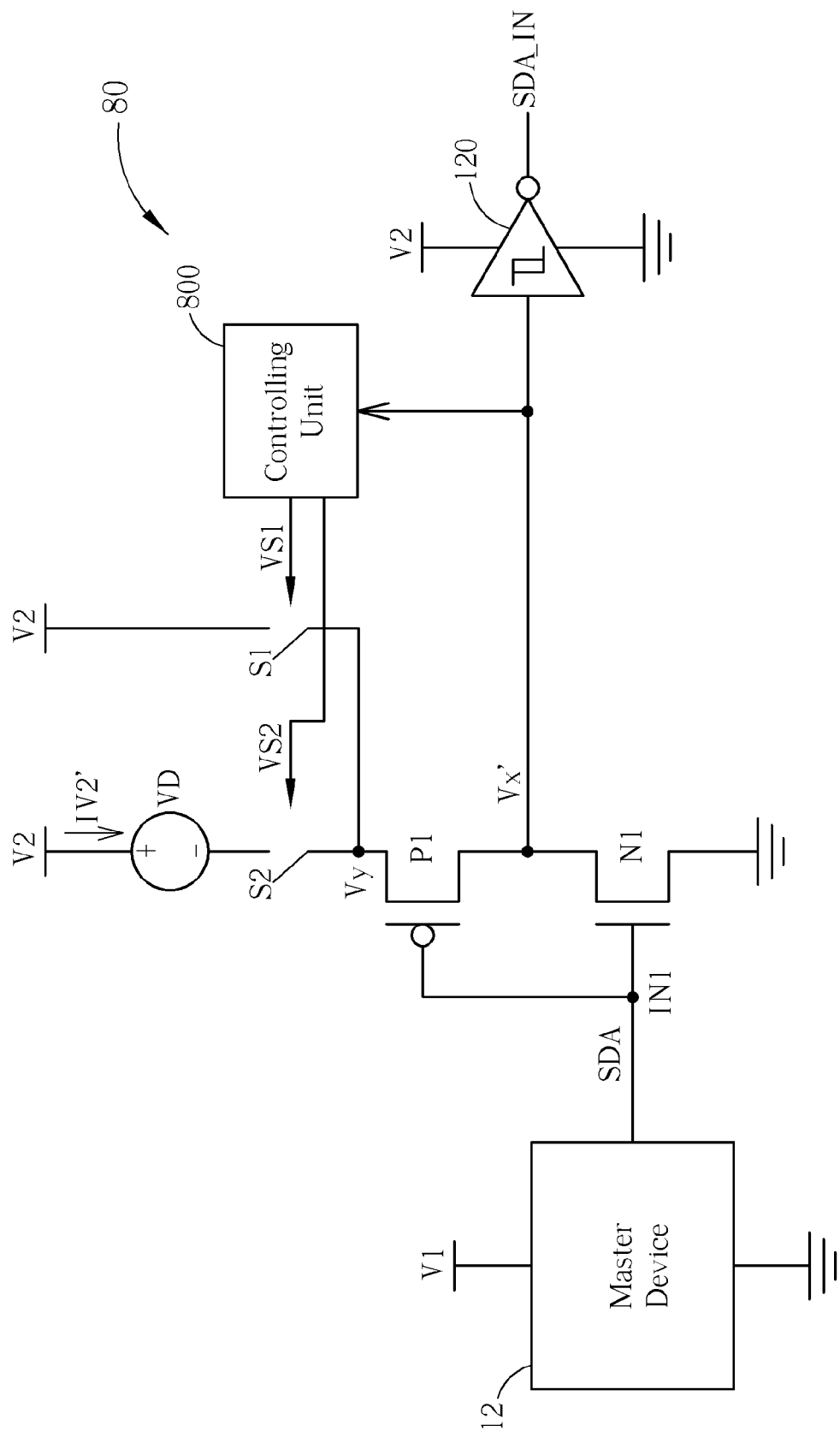
FIG. 8 is a schematic diagram of an interface circuit for an Inter-Integrated Circuit bus according to an embodiment of the present invention

Please refer to FIG. 8, which is a schematic diagram of an interface circuit 80 for an I2C serial bus. The structure of the interface circuit 80 is similar to that of the interface circuit 40. The only difference is that switches S1 and S2, and a control unit 800 are newly added. The control unit 800 is used for generating control signals VS1 and VS2) corresponding to the switches S1 and switch S2 respectively. When the switch S1 is on and the switch S2 is off, the first voltage Vy is charged to the driving voltage V2 for enhancing charging efficiency of the voltage signal Vx. Compared with FIG. 1, the current operating state of the interface circuit 80 is identical to that of the interface circuit 10 and leakage current exists as well. When the switch S1 is off and the switch S2 is on, the interface circuit 80 has the same operating state as the interface circuit 40.

When the signal data SDA keeps staying at the high voltage level V1, if the control unit 800 detects the voltage signal Vx' has stayed at the low voltage level for a time T, the control unit 800 determines that the interface circuit 80 has been in the standby mode, and then conducts the switch S1 and shuts the switch S2 off with the control signals VS1 and VS2. In this situation, the first voltage Vy drops down to (V2−VD) so the PMOS P1 is turned off, dissipating the leakage current (the current IV2').

Figure 9:
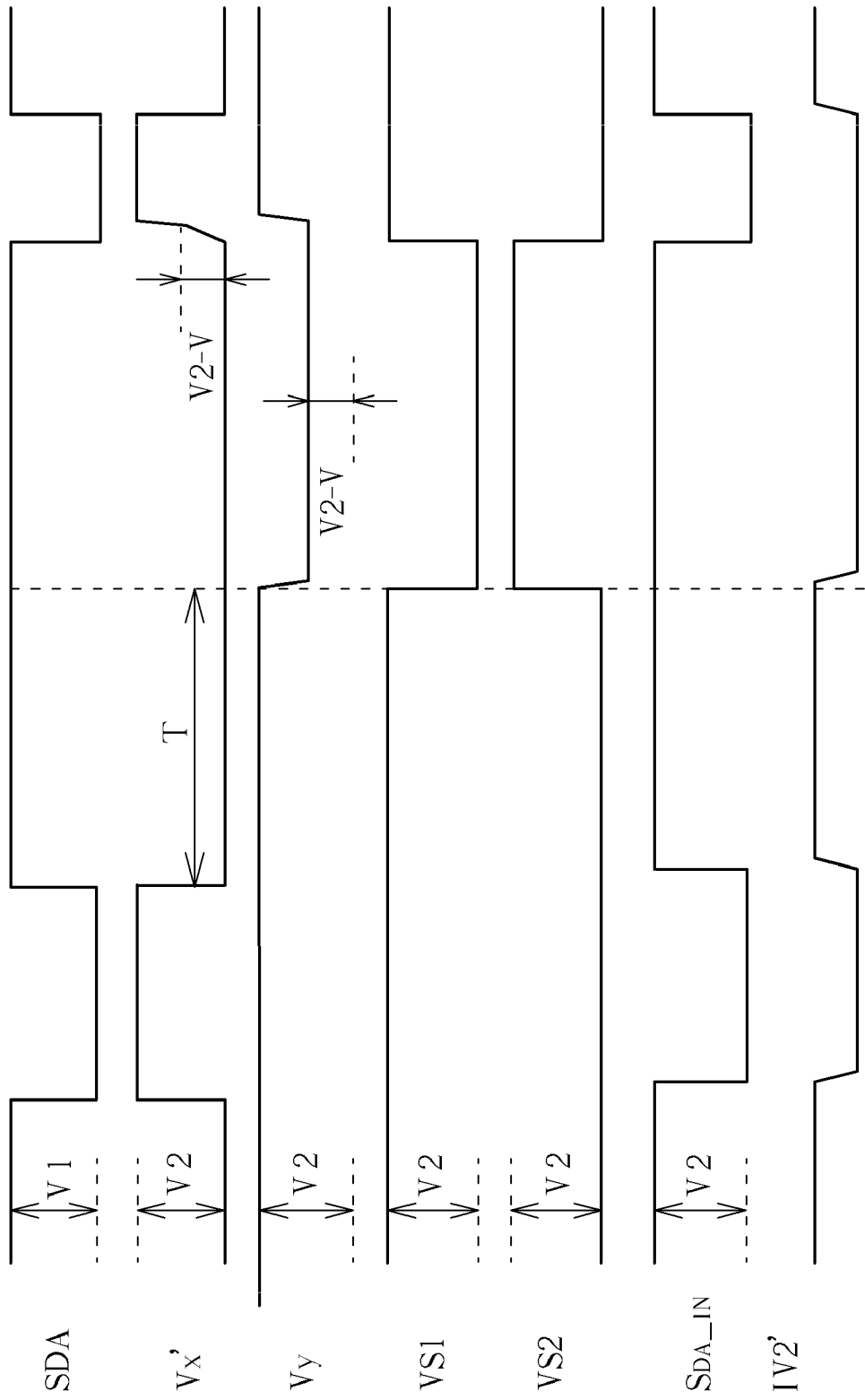
FIG. 9 is a schematic diagram of signal timing of the interface circuit according to FIG. 8.

Please refer to FIG. 9, which is a schematic diagram of a signal timing of the interface circuit 80. The related signals from top to bottom are illustrated as follows: the data signal SDA, the voltage signal Vx', a first voltage Vy, a control signal VS1, control signal VS2, the data output signal SDA_IN and the current IV2'. As shown in FIG. 9, when having entered a low voltage level for time T, the voltage signal Vx' switches the control signal VS1 and the control signal VS2 to shut PMOS P1 off with the first voltage Vy so that the current IV2' is eliminated. When the voltage signal Vx' undergoes a transition, the control unit 800 switches the control signal VS1 and the control signal VS2 back to the original voltage levels for the normal operation mode.

Please note that, in the interface circuits 40, 60 and 80, the voltage source 410 can be realized by a resistor, a diode and a PMOS. Those skilled in the art can control the threshold voltage of PMOS by adjusting the voltage drop and corresponding current appropriately.

In conclusion, the embodiments of the present invention control the threshold voltage of PMOS through voltage source and use the on-off relationship between PMOS and NMOS for the reduction of the leakage current. In addition, the logical level of the output signal is not affected.

Those skilled in the art will readily observe that numerous modifications and alterations of the device and method may be made while retaining the teachings of the invention.

What is claimed is:

1. An interface circuit for a serial bus, the interface circuit comprising:
   a receiving terminal for receiving an input signal having a first signal level and a second signal level;
   an output terminal for outputting a first voltage signal;
   a first switching circuit coupled to the receiving terminal, the output terminal and a grounded terminal, for determining a coupling relationship between the output terminal and the grounded terminal according to difference between the input signal and a grounding voltage provided by the grounded terminal;
   a voltage source for producing a voltage drop based on a driving voltage to provide a first voltage, the driving voltage driving the serial bus interface circuit;
   a second switching circuit coupled to the receiving terminal, the first switching circuit, the output terminal and the voltage source, for determining a coupling relationship between the first switching circuit and the voltage source according to difference between the input signal and the first voltage;
   a first switch coupled between the voltage source and the second switching circuit, for determining a coupling relationship between the voltage source and the second switching circuit according to a first control signal;
   a second switch coupled to the second switching circuit, for determining a coupling relationship between the driving voltage and the second switching circuit according to a second control signal; and
   a controlling unit coupled to the output terminal, for generating the first control signal and the second control signal according to the first voltage signal;
   wherein the first switching circuit eliminates generation of a first current flowing from the voltage source to the grounded terminal when the input signal is at a steady state of the first signal level, and the second switching circuit eliminates the generation of the first current when the input signal is a steady state of the second signal level.

2. The interface circuit of claim 1, wherein the first switching circuit is a N type metal oxide semiconductor (NMOS) having a drain electrode coupled to the output terminal, a gate electrode coupled the receiving terminal, and a source electrode coupled to the grounded terminal.

3. The interface circuit of claim 2, wherein the second switching circuit is a P type metal oxide semiconductor (PMOS) having a drain electrode coupled to the output terminal and the first switching circuit, a gate electrode coupled the receiving terminal, and a source electrode coupled to the voltage source.

4. The interface circuit of claim 3, wherein the input signal is a square-wave signal, the first signal level is the minimum level of the square-wave signal, and the second signal level is the maximum level of the square-wave signal.

5. The interface circuit of claim 1 further comprising a Schmitt trigger coupled to the output terminal, for transferring the first voltage signal to a square wave signal.

6. The interface circuit of claim 1 further comprising an accelerating circuit coupled to the output terminal, for adjusting a maximum signal level of the first voltage signal to the driving voltage.

7. The interface circuit of claim 6, wherein the accelerating circuit comprises:
   an inverter having a first terminal for receiving the first voltage signal, and a second terminal; and
   a PMOS having a drain electrode for receiving the first voltage signal, a gate electrode coupled to the second terminal of the inverter, and a source electrode coupled to the driving voltage.

8. The interface circuit of claim 1, wherein the input signal is generated by a master device of the serial bus.

* * * * *